(12) United States Patent
Panero et al.

(10) Patent No.: US 11,559,845 B2
(45) Date of Patent: Jan. 24, 2023

(54) METHOD OF REPAIRING A REGION OF A PART INCLUDING A THREADED HOLE

(71) Applicant: PRATT & WHITNEY CANADA CORP., Longueuil (CA)

(72) Inventors: Samuel Panero, Montréal (CA); David Buffett, Hubbards (CA); Patrick Neal, Fall River (CA)

(73) Assignee: PRATT & WHITNEY CANADA CORP., Longueuil (CA)

( * ) Notice: Subject to any disclaimer, the term of this patent is extended or adjusted under 35 U.S.C. 154(b) by 208 days.

(21) Appl. No.: 16/788,689

(22) Filed: Feb. 12, 2020

(65) Prior Publication Data
US 2021/0245279 A1 Aug. 12, 2021

(51) Int. Cl.
*B23G 9/00* (2006.01)
*B23P 6/00* (2006.01)
*B23K 9/04* (2006.01)

(52) U.S. Cl.
CPC ............ *B23G 9/009* (2013.01); *B23K 9/048* (2013.01); *B23P 6/00* (2013.01)

(58) Field of Classification Search
CPC .............. B23G 9/009; B23G 2240/36; B23G 2240/60; B23P 6/00; F05D 2230/80; F05D 2230/72; B23K 10/027; B23K 11/0013; B23K 26/342
See application file for complete search history.

(56) References Cited

U.S. PATENT DOCUMENTS

2014/0068908 A1* 3/2014 Hickey .................. F16B 37/02
411/501
2017/0333934 A1 11/2017 Le Do

* cited by examiner

*Primary Examiner* — Christopher J Besler
(74) *Attorney, Agent, or Firm* — Norton Rose Fulbright Canada LLP

(57) ABSTRACT

Methods of repairing a periphery of a threaded hole of a part are provided. An embodiment of the method includes adding material to a region of the part including on a periphery of the threaded hole. New threads are formed in the added material. The new threads are continuous with existing threads formed in the hole.

16 Claims, 9 Drawing Sheets

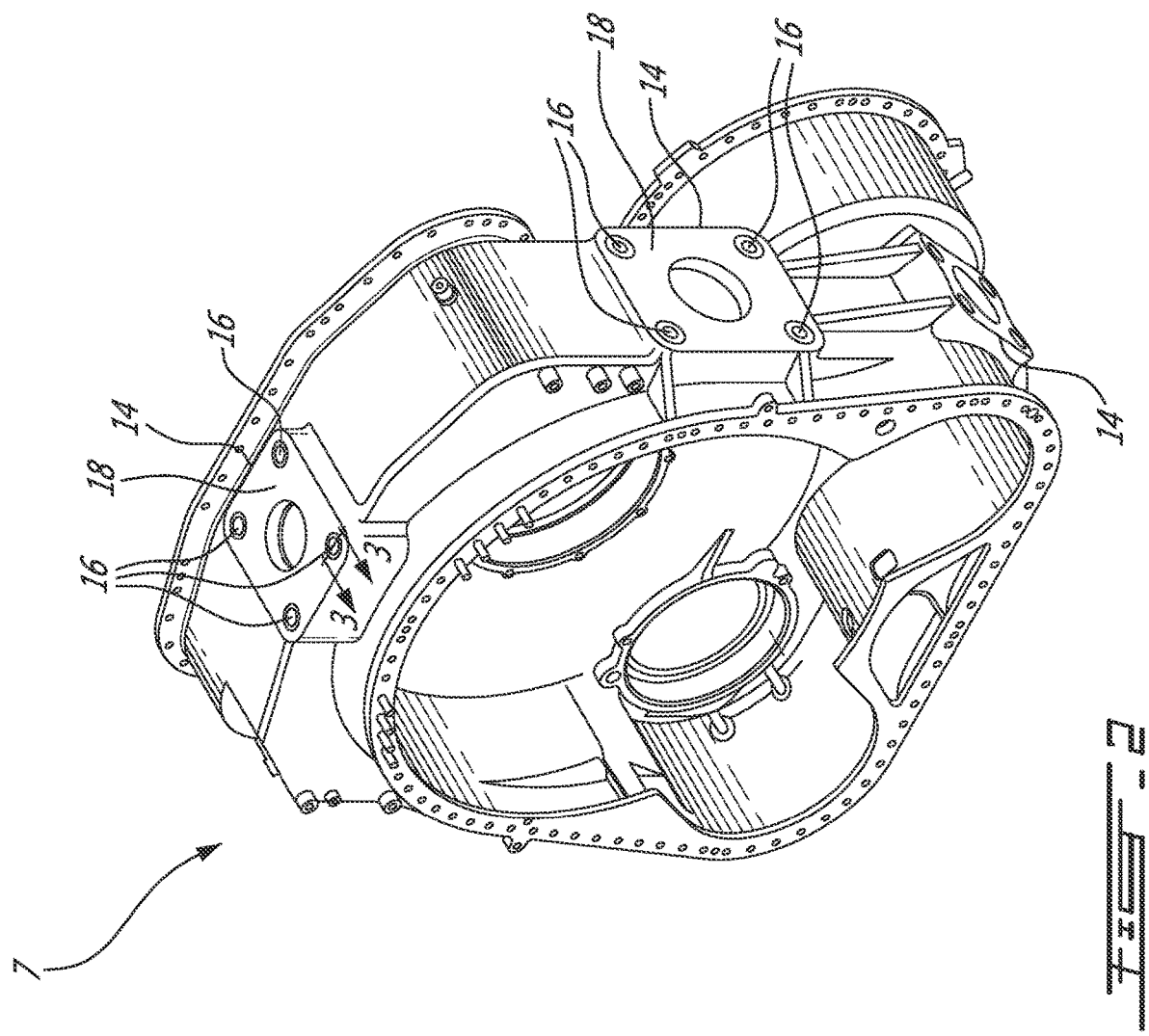

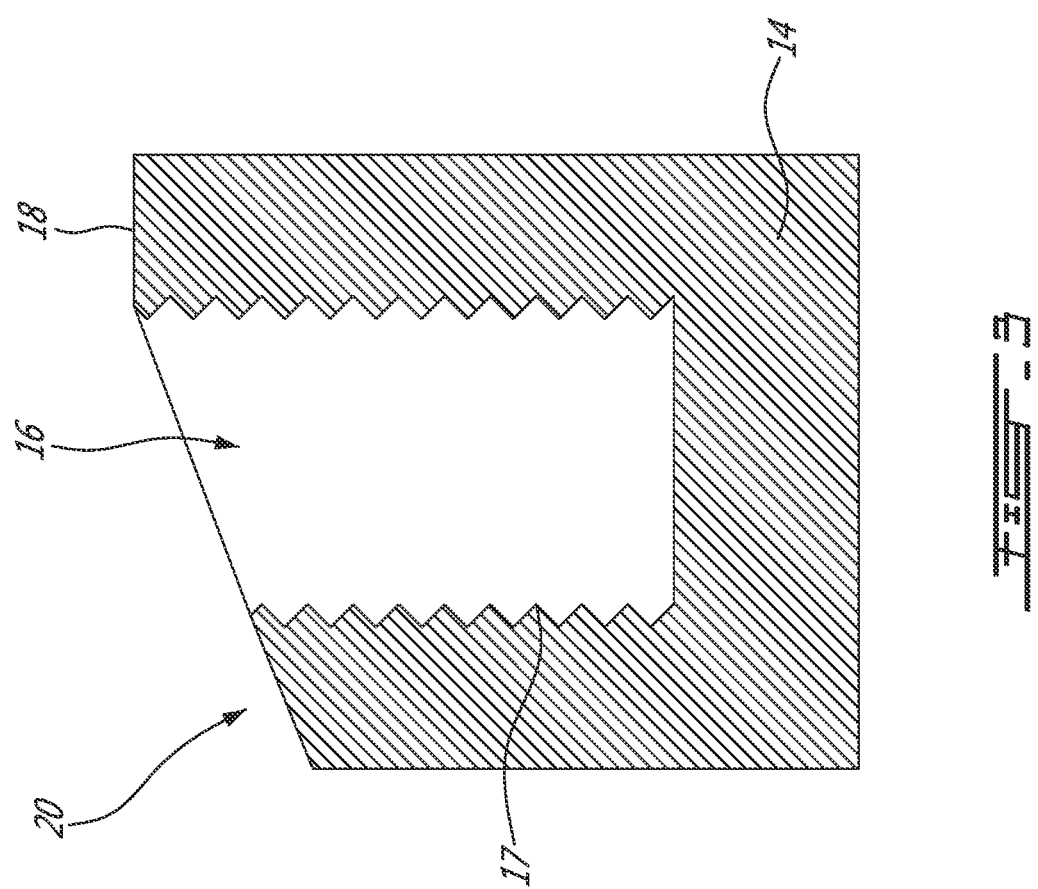

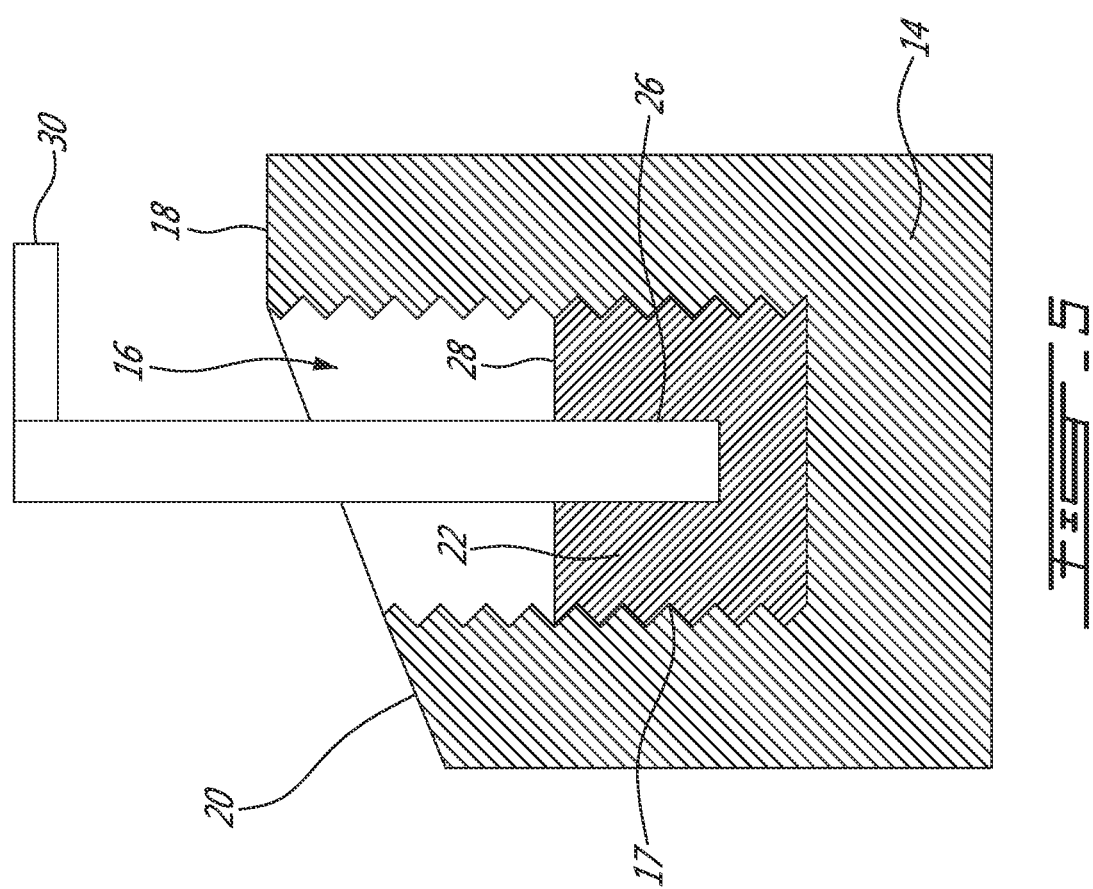

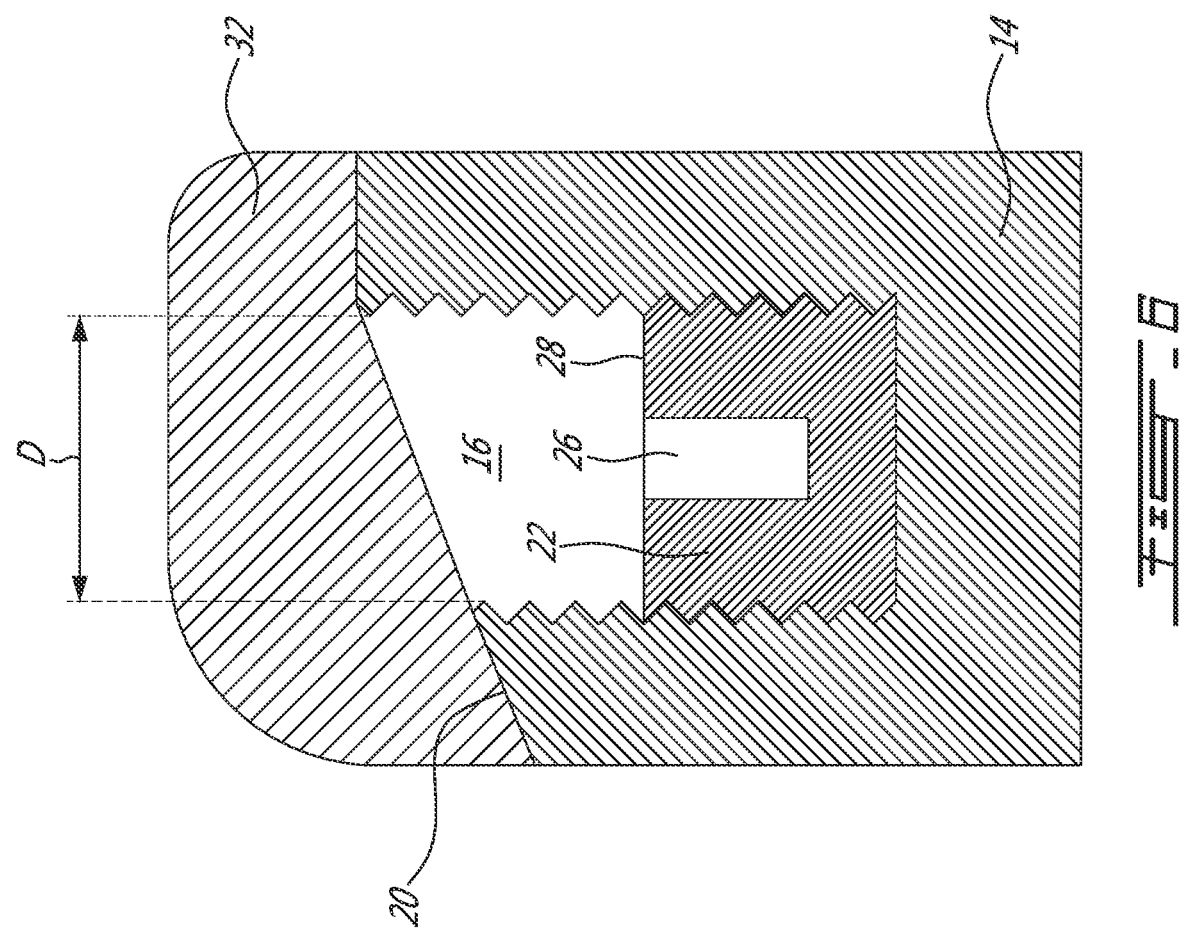

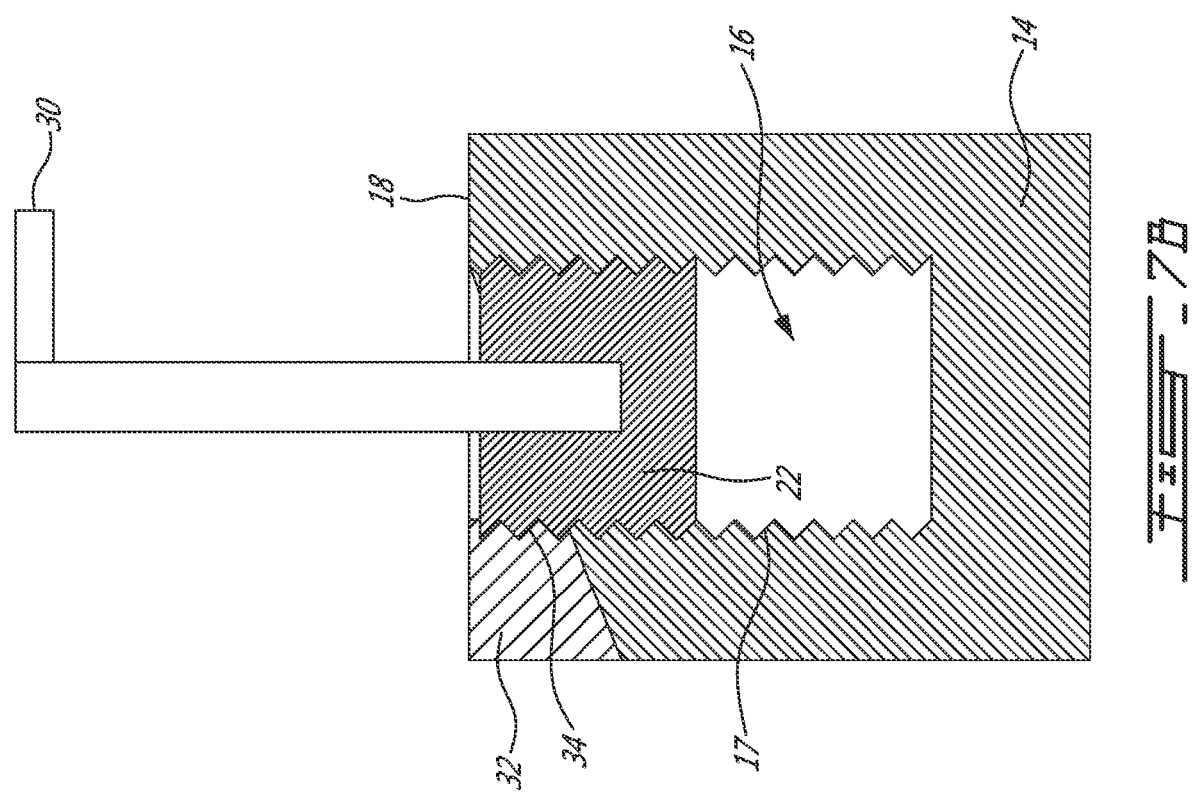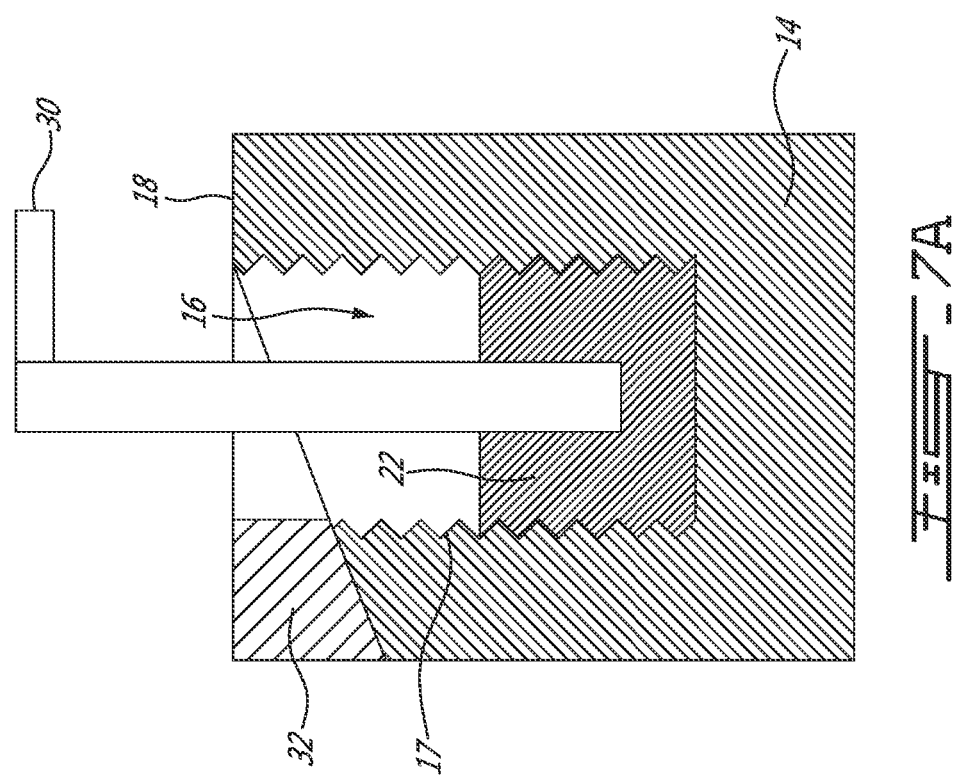

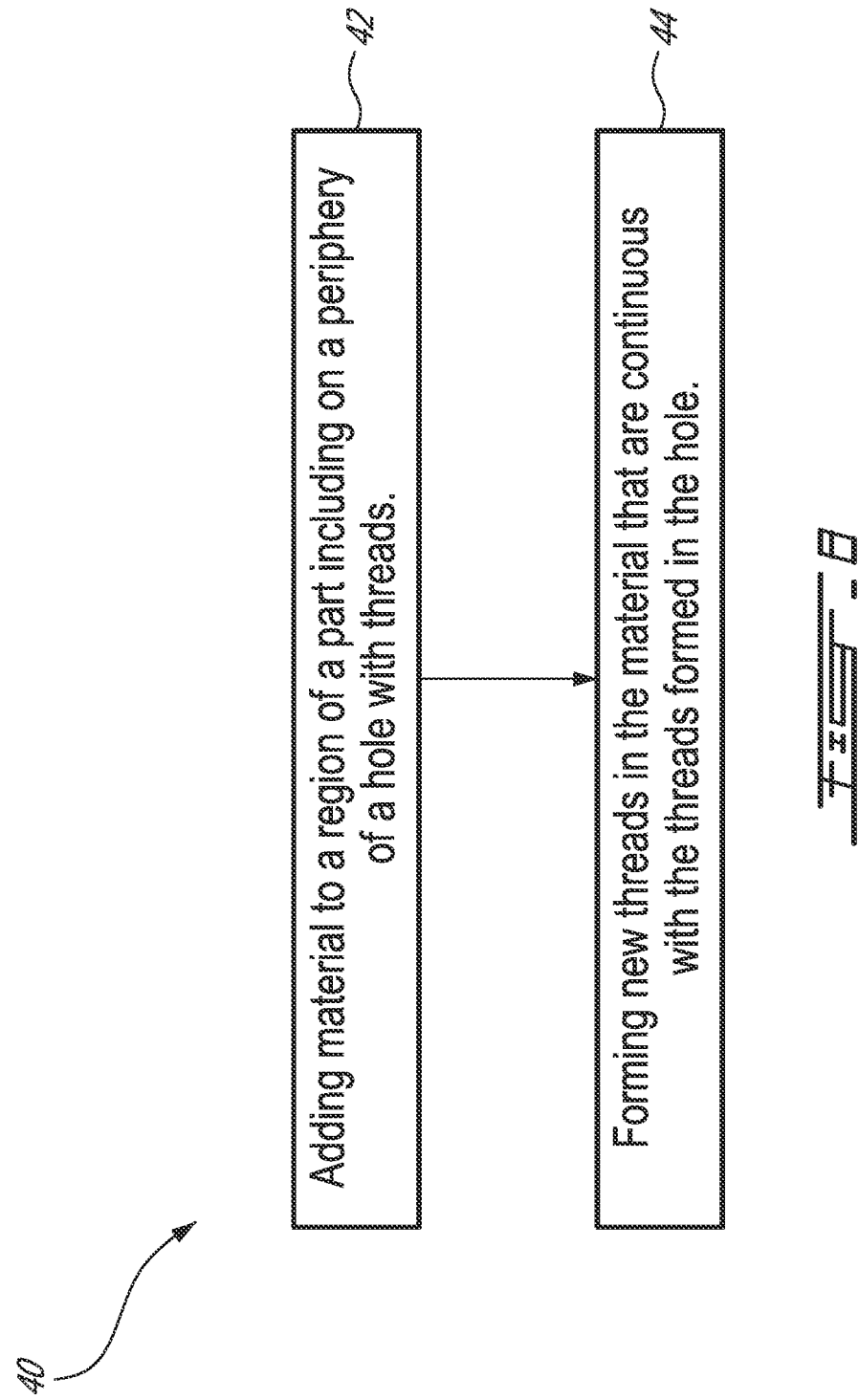

METHOD OF REPAIRING A REGION OF A PART INCLUDING A THREADED HOLE

TECHNICAL FIELD

The disclosure relates generally to repairing parts, and more particularly to repairing a region of a part such as a casting including a threaded hole.

BACKGROUND

Gas turbine engines typically include one or more larger parts (e.g., casings, housings) that may be relatively expensive and that may be produced by casting. Various factors in a casting process can cause the presence of one or more defects on a casting. Some casting defects might only be detected after the casting part has undergone subsequent machining and/or finishing (e.g., grinding, drilling, tapping) operations. Depending on the location, type and size of a defect, the presence of the defect may result in the whole casting having to be scrapped. Improvement is desirable.

SUMMARY

In one aspect, the disclosure describes a method of repairing a region of a part where the region includes a hole with existing threads formed in the hole. The method comprises:

adding material to the region of the part including at least on part of a periphery of an opening of the hole with the existing threads; and forming new threads in the material added to the region of the part, the new threads being continuous with the existing threads formed in the hole.

In another aspect, the disclosure describes a method of repairing a casting. The method comprises:

receiving the casting, the casting including a defect in a face around an opening of a hole with existing threads formed in the hole;

installing a tap inside the hole, the tap threadably engaged with the existing threads formed in the hole;

after installing the tap inside the hole, adding material to the casting to at least partially cover the defect in the face and at least partially cover a periphery of the opening of the hole with the existing threads; and after adding the material to the casting, using the tap to form new threads in the material added to the casting, the new threads being continuous with the existing threads formed in the hole.

In a further aspect, the disclosure describes an assembly comprising:

a part including:

a substrate including a region including a hole with existing threads formed in the hole; and repair material added to the region of the substrate including at least on part of a periphery of an opening of the hole, the repair material defining an unthreaded extension of the hole; and a tap disposed entirely inside the hole and threadably engaged with the existing threads formed in the hole.

Further details of these and other aspects of the subject matter of this application will be apparent from the detailed description included below and the drawings.

DESCRIPTION OF THE DRAWINGS

Reference is now made to the accompanying drawings, in which:

FIG. 2 is a schematic perspective view of an exemplary housing of the reduction gearbox comprising mounting pads with blind holes for mounting the housing to a structure of an aircraft;

FIG. 3 is a cross-sectional view through a mounting pad of FIG. 2 taken along line 3-3 of FIG. 2 showing a hole containing an exemplary defect in a face around the hole;

FIG. 5 is a cross-sectional view through the mounting pad of FIG. 2 taken along line 3-3 of FIG. 2 showing the modified tap installed in the hole;

FIG. 6 is a cross-sectional view through the mounting pad of FIG. 2 taken along line 3-3 of FIG. 2 showing the modified tap installed in the hole and new material added to cover the defect;

FIG. 7A is a cross-sectional view through the mounting pad of FIG. 2 taken along line 3-3 of FIG. 2 showing the modified tap installed inside the hole and an unthreaded extension of the hole being defined by the new material;

FIG. 7B is a cross-sectional view through the mounting pad of FIG. 2 taken along line 3-3 of FIG. 2 showing the modified tap being used to form threads in the unthreaded extension of the hole;

FIG. 8 is a flow chart of an exemplary method for a repairing a region of a part that includes a threaded hole.

DETAILED DESCRIPTION

The present disclosure describes methods useful for repairing parts. In some embodiments, the methods may be used for repairing a defect located in a face around an opening of a hole of the part. In various embodiments, aspects of the present disclosure may be particularly useful for repairing (e.g., relatively large) castings such as compressor or turbine casings, and gearbox housings of gas turbine engines for example. One disclosed method includes receiving a part that includes a defect in a region that includes a threaded hole. Material is added to the part by welding or other material addition (i.e., additive manufacturing, 3D printing) process to at least partially cover the defect and at least part of a periphery of the threaded hole. Threads are formed in the newly added material to form new threads that are continuous with existing threads previously formed in the threaded hole.

In some embodiments, the methods described herein may permit a part having a defect near or at a periphery of a hole in the part to be repaired. In some embodiments, the methods described herein may permit some parts having defects to be salvaged thereby reducing scrap costs.

The term "substantially" as used herein may be applied to modify any quantitative representation which could permissibly vary without resulting in a change in the basic function to which it is related.

Aspects of various embodiments are described through reference to the drawings.

Figure 1:
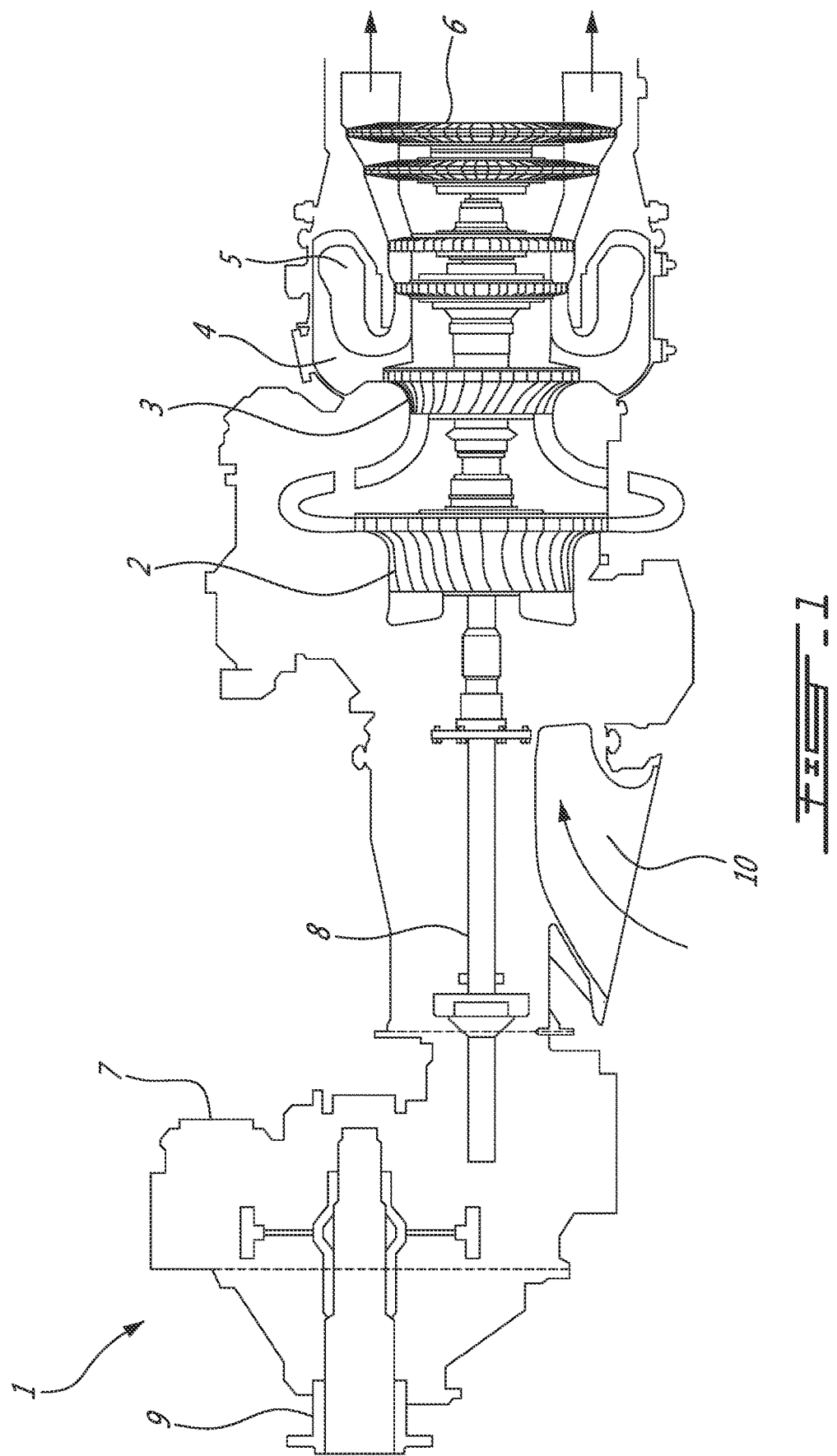
FIG. 1 is a schematic axial cross-sectional view through an exemplary turboprop gas turbine engine with a reduction gearbox between an engine shaft and a propeller shaft.

FIG. 1 shows an axial cross-section through an example turbo-prop gas turbine engine 1. It will be understood that aspects of this disclosure are equally applicable to other types of aircraft engines such as a turboshaft, turbofan, or auxiliary power units. It is also understood that the methods described herein may be used to repair parts made by processes other than casting and also parts that are intended for applications other than gas turbine engines.

Intake air for engine 1 enters inlet 10 and is ducted through the low-pressure centrifugal compressor 2 and high-pressure centrifugal compressor 3. Compressed air exits compressor 3 and is contained within plenum 4 that surrounds combustor 5. Fuel is supplied to combustor 5 and fuel is mixed with air the plenum 4 when sprayed through nozzles into combustor 5 as a fuel-air mixture is ignited. Compressed air within plenum 4 is admitted into combustor 5 through orifices in the side walls of combustor 5 to mix with the hot gases from combustor 5 and pass over turbines 6 before exiting an aft portion of engine 1 as exhaust.

Engine 1 may include one or more parts that have been manufactured using a casting process. Some cast components may be made of relatively soft metals such as a magnesium-based material (e.g. alloy) and/or an aluminum-based material (e.g., alloy). As an example, reduction gearbox housing 7 located between the engine shaft 8 and the propeller shaft 9 may be formed using a casting process. Compressors 2 and 3 may each be housed within a compressor case (not shown) that may also be formed using a casting process. The casting processes used to form the cast components of engine 1 may include, but is not limited to, die casting, investment casting and centrifugal casting.

In reference to FIG. 2, housing 7 includes one or more mounting pads 14 that each include flat surface (e.g., face 18) providing an interface for mounting housing 7 (and hence the engine) to an aircraft structure using one or more suitable engine mounting elements (not shown). Each mounting pad 14 has four blind holes 16 within which threaded fasteners (not shown) are fastened to secure housing 7 to the aircraft structure.

FIG. 3 depicts a cross-sectional view through mounting pad 14 of FIG. 2 taken along line 3-3 of FIG. 2 showing an exemplary hole 16 with threads 17 formed in hole 16 and defect 20 located at a periphery of hole 16. Defect 20 may be on face 18 of mounting pad 14 and a periphery of hole 16. As depicted, defect 20 may be a depression on face 18 surrounding hole 16. Defect 20 may have formed as a result of insufficient casting material having reached the region of face 18 during a casting process used to form housing 7. In some embodiments, defect 20 may be a misrun or cold shut for example. A misrun is a casting defect that can form when liquid feed metal does not completely fill a mould cavity during a casting process. A cold shut is a casting defect that can occur when two streams of liquid feed metal do not join properly when a part is being cast. In some embodiments, defect 20 may be a shrinkage defect that can occur when there is not enough feed metal to compensate for shrinkage of the casting as the metal solidifies. It may be desirable to repair mounting pad 14 to have a flat face 18 surrounding hole 16 to provide a suitable mating interface between mounting pad 14 and another component.

Figure 4B:
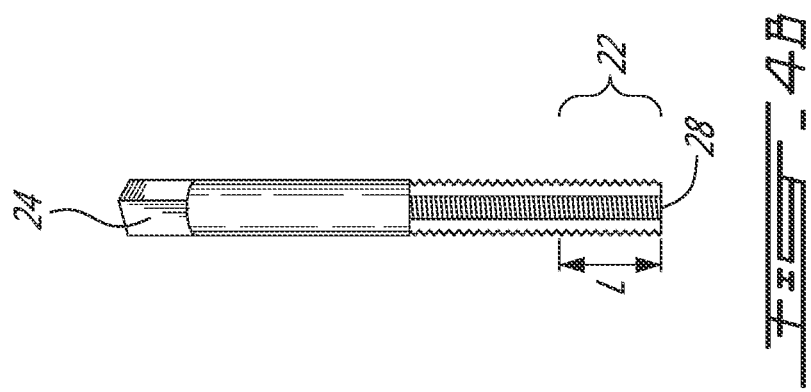
FIG. 4B is a front view of a conventional tap that may be modified to form the modified tap shown in FIG. 4A.
Figure 4A:
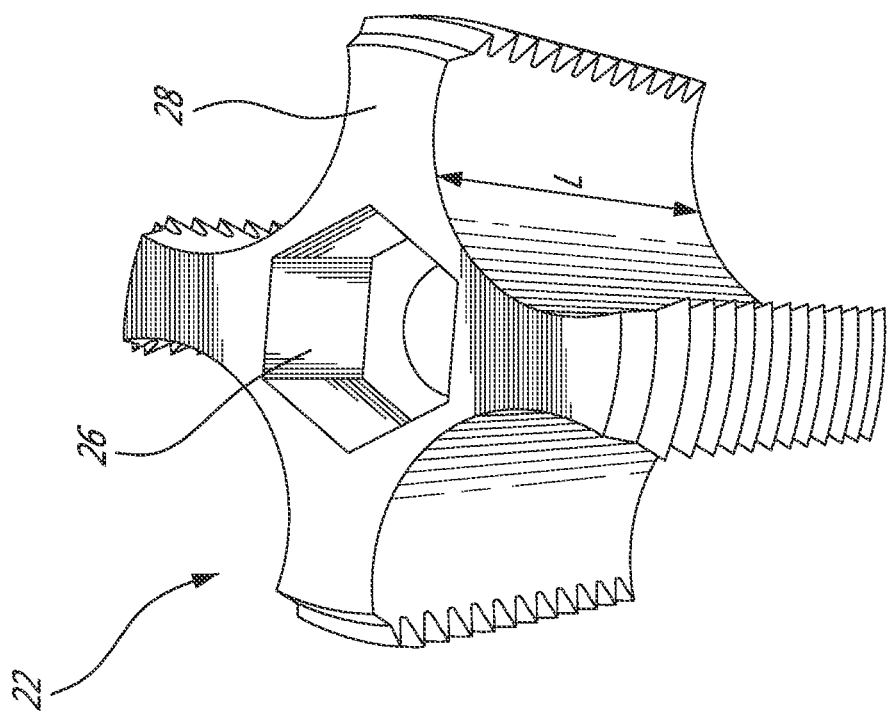
FIG. 4A is a perspective view of an exemplary modified tap that may be used for repairing the defect of FIG. 3.

FIG. 4A depicts a perspective view of modified tap 22 that may be used for repairing defect 20 and FIG. 4B depicts a front view of conventional tap 24 that may be modified to form modified tap 22. Modified tap 22 may be made of tool steel or high-speed steel for example. Modified tap 22 may be sized to form threads that are equal in size and type to existing threads 17 formed in hole 16. As depicted, modified tap 22 may be completely threaded over its length L. Length L of modified tap 22 may depend on a depth of hole 16. In some embodiments, it may be desirable for modified tap 22 to have length L that is about 50% of a depth of hole 16 from face 18. In some embodiments, modified tap 22 may have length L that is less than 50% of a depth of hole 16 from face 18. In some embodiments, length L of modified tap 22 may be selected to have a number of cutting threads sufficient to form new threads in the newly added material. For example, length L of modified tap 22 may be selected to have six (6) cutting threads.

In some embodiments, modified tap 22 may be formed by modifying conventional tap 24 to remove an unthreaded portion (e.g., shank) of conventional tap 24. In some embodiments, part of a threaded portion of conventional tap 24 may also be removed to form modified tap 22. The modification of conventional tap 24 may depend on a desired length L of modified tap 22. Conventional tap 24 may be cut manually or automatically using a suitable saw for example. Other suitable machines or tools may be used for cutting conventional tap 24 to form modified tap 22.

Modified tap 22 may include leading end 28 (i.e., tip) of conventional tap 24. Socket 26 may be formed on leading end 28 of modified tap. A shape of socket 26 may be chosen to permit engagement of an end of tool 30 (see FIG. 5). Socket 26 may be formed on leading end 28 of modified tap 22 using computer numerical control (CNC) machining or other suitable material removal process. Socket 26 may extend across a portion of length L of modified tap 22 that is sufficient to allow an end of tool 30 to be received in socket 26 and tool 30 to drive modified tap 22 out of hole 16 and form new threads in the added material when a suitable driving torque is applied to the tool 30.

FIG. 5 depicts a cross-sectional view through mounting pad 14 of FIG. 2 taken along line 3-3 of FIG. 2 showing hole 16 having modified tap 22 installed in hole 16. Modified tap 22 may be installed in hole 16 to repair mounting pad 14 containing defect 20 at a periphery of hole 16. Modified tap 22 may be installed in hole 16 to be disposed entirely inside hole 16 and to be threadably engaged with existing threads 17 previously formed in the hole 16. As depicted, modified tap 22 may be installed in hole 16 having leading end 28 facing an opening (entrance) of hole 16. Modified tap 22 may be installed within hole 16 using tool 30. Modified tap 22 may be screwed inside hole 16 to have threads of modified tap 22 threadably engaged with existing threads 17. Tool 30 may include an end that is configured to tightly fit within socket 26 of modified tap 22 to screw modified tap 22 within hole 16 when a torque is applied to tool 30. In some embodiments, tool 30 may be a hex key (also known as "Allen wrench" or "Allen key") and socket 26 may have a hexagon profile for receiving the hex key. In some embodiments, modified tap 22 may be installed in hole 16 to be at a sufficient depth from face 18 to mitigate the exposure of modified tap 22 to the elevated temperatures associated with adding new material 32 in proximity to hole 16.

FIG. 6 depicts a cross-sectional view through mounting pad 14 of FIG. 2 taken along line 3-3 of FIG. 2 showing hole 16 having modified tap 22 installed in hole 16 and having material 32 added to mounting pad 14 to at least partially cover defect 20. In some embodiments, material 32 added to mounting pad 14 may be a metallic material that is metallurgically compatible with the base (substrate) material of the part. Mounting pad 14 may be composed of a similar metal as the metal added to mounting pad 14. The metal may be deposited on mounting pad 14 by a welding or other additive manufacturing process. For example, material 32 may include multiple weld beads that have been stacked to form a buildup that covers defect 20 and a region near and/or at the periphery of the opening of hole 16.

In some embodiments, mounting pad 14 and material 32 added may both be composed of relatively soft metals. In some embodiments, it may be desirable for modified tap 22 to be located at a sufficient distance from material 32 added to mounting pad 14 to ensure that modified tap 22 is not affected by heat generated during the welding process used to deposit material 32 on mounting pad 14. Modified tap 22 may be spaced apart from material 32 by a gap/distance sufficient to limit the exposure of modified tap 22 to the elevated temperatures associated with depositing material 32.

As depicted, material 32 added to mounting pad 14 may extend completely around a periphery of hole 16. In alternative embodiments, material 32 added to mounting pad 14 may only be added to a portion of a periphery of hole 16. In this situation, material 32 may be added to the portion of the periphery of hole 16 where defect 20 is present. In some embodiments, additional machining may be performed after material 32 is added to restore face 18 surrounding hole 16 without defect 20 therein.

In some embodiments, part of material 32 added to mounting pad 14 may at least partially cover an opening of hole 16. In these situations, mounting pad 14 may require further machining to remove the material obstructing hole 16. The material at least partially covering the opening of hole 16 may be drilled coaxially with hole 16 using a CNC machine for example. In some embodiments, additional machining may be performed after drilling to obtain a flat surface surrounding hole 16. Prior to drilling through material 32 and optionally prior to depositing material 32, a position and an orientation of hole 16 may be established relative to a datum such as a reference coordinate system of the CNC machine. The reference coordinate system of the CNC machine may be set to have an origin at a physical reference on housing 7.

With the position and orientation of hole 16, material 32 may be drilled to form an unthreaded extension of hole 16. The drill bit used to drill through the material 32 at least partially covering the opening of hole 16 may be sized to create a hole that defines define an unthreaded extension of hole 16 and that has a diameter D that substantially corresponds to a minor diameter of existing threads 17 of hole 16. FIG. 6 shows the hole of minor diameter D to be drilled in the material 32 partially or completely covering hole 16 in stippled lines.

FIG. 7A depicts a cross-sectional view through mounting pad 14 of FIG. 2 taken along line 3-3 of FIG. 2 showing modified tap 22 installed inside hole 16 and an unthreaded extension of hole 16. Material 32 added to mounting pad 14 may have undergone additional machining or grinding after material 32 was added to restore face 18 around the unthreaded extension.

FIG. 7B depicts a cross-sectional view through mounting pad 14 of FIG. 2 taken along line 3-3 of FIG. 2 showing modified tap 22 being removed and new threads 34 being formed in the unthreaded extension of hole 16 by modified tap 22. As depicted, removing modified tap 22 from hole 16 using tool 30 may cause modified tap 22 to cut into added material 32 thereby forming new threads 34 in the added material 32. Modified tap 22 may be removed from hole 16 by unscrewing modified tap 22 from hole 16. New threads 34 formed in material added 32 may be continuous with existing threads 17 formed in hole 16. This may allow a single threaded fastener to be concurrently threadably engaged with existing thread 17 formed in hole 16 and with new threads 34 formed in added material 32.

FIG. 8 is a flow chart of an exemplary method 40 for repairing a region of a part (e.g. housing 7). The region may include a hole (e.g. hole 16) with threads (e.g. threads 17) formed in the hole 16. It is understood that aspects of method 40 can be combined with aspects of other methods described herein. In various embodiments, method 40 includes:

adding material 32 to a region of a part 7 including at least on part of a periphery of an opening of the hole 16 with threads 17 (see block 42); and forming new threads 34 in the material 32 added to the region of the part that are continuous with the existing threads 17 formed in the hole 16 (see block 44).

In some embodiments, method 40 may also include installing modified tap 22 entirely inside hole 16 to be threadably engaged with existing threads 17 formed in hole 16 prior to adding material 32. Modified tap 22 may be installed inside hole 16 using tool 30 that fits in and drivingly engages socket 26 defined on the leading end 28 of modified tap 22. The end of tool 30 may be fitted within socket 26 and tool 30 may be used to drive modified tap 22 inside hole 16.

In some embodiments method 40 may also include drilling through added material 32 at least partially covering the opening of hole 16 to form an unthreaded extension of hole 16. The unthreaded extension may have a diameter D that corresponds to a minor diameter of existing threads 17 of hole 16.

Forming new threads 34 in material 32 may include fitting an end of tool 30 within socket 26 of modified tap 22 and removing modified tap 22 from hole 16 using tool 30 causing modified tap 22 to cut material 32 to form new threads 34 in material 32. New threads 34 may be continuous with existing threads 17 formed in hole 16. Material 32 added may be a relatively soft metal to permit modified tap 22 to form new threads 34 in material 32.

Figure 9:
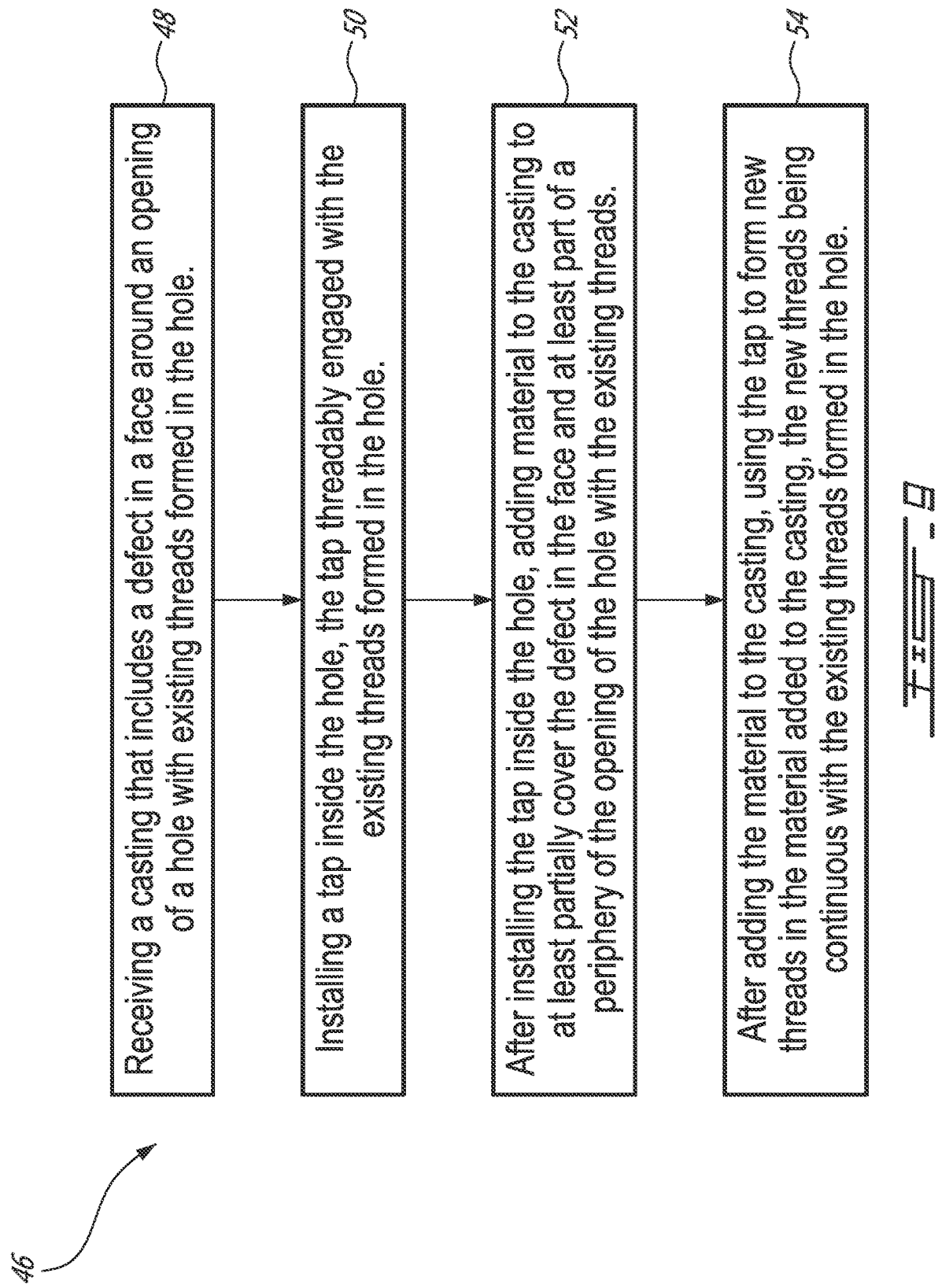
FIG. 9 is a flow chart of an exemplary method for a repairing a casting that includes a defect in a region including a threaded hole.

FIG. 9 is a flow chart of an exemplary method 46 for a repairing a casting (e.g. housing 7). The casting may include a defect (e.g. defect 20) in a region including a hole (e.g. hole 16) with threads (e.g. threads 17) formed in the hole. It is understood that aspects of method 46 can be combined with aspects of other methods described herein. In various embodiments, method 46 includes:

receiving the casting 7 that includes a defect 20 in a face 18 around an opening of a hole 16 with existing threads 17 formed in the hole 16 (see block 48);

installing a tap 22 inside the hole 16, the tap 22 threadably engaged with the existing threads formed in the hole 16 (see block 50);

after installing the tap 22 inside the hole 16, adding material 32 to the casting to at least partially cover the defect 20 in the face 18 and at least part of a periphery of the opening of the hole 16 with the existing threads 17 (see block 52); and after adding the material 32 to the casting, using the tap 22 to form new threads 34 in the material 32 added to the casting, the new threads 34 being continuous with the existing threads 17 formed in the hole 16 (see block 54).

The embodiments described in this document provide non-limiting examples of possible implementations of the present technology. Upon review of the present disclosure, a person of ordinary skill in the art will recognize that changes may be made to the embodiments described herein without departing from the scope of the present technology.

For example, the methods are described in relation to a hole disposed on a mounting pad of a gearbox housing but it is understood the methods described herein are equally applicable to other (e.g., cast) parts of various sizes, various shapes and various (e.g., metallic) materials including aluminum alloys, magnesium alloys and steels for example. Yet further modifications could be implemented by a person of ordinary skill in the art in view of the present disclosure, which modifications would be within the scope of the present technology

What is claimed is:

1. A method of repairing a region of a part, the region including a hole with existing threads formed in the hole, the method comprising:
   installing a tap inside the hole, the tap threadably engaged with the existing threads formed in the hole;
   after installing the tap inside the hole, adding material to the region of the part including at least on part of a periphery of an opening of the hole with the existing threads; and
   using the tap to form new threads in the material added to the region of the part, the new threads being continuous with the existing threads formed in the hole.

2. The method of claim 1, wherein:
   the tap has a leading end; and
   the leading end of the tap is facing the opening of the hole when the tap is installed inside the hole.

3. The method of claim 2, wherein forming the new threads in the material added to the region of the part comprises:
   engaging a tool with the tap; and
   using the tool to rotate the tap and cause the tap to form the new threads in the material added to the region of the part.

4. The method of claim 1, wherein the material added to the region of the part at least partially covers a defect in the region of the part.

5. The method of claim 1, wherein the material added to the region of the part extends completely around the periphery of the hole.

6. The method of claim 1, wherein the material added to the region of the part at least partially covers the opening of the hole.

7. The method of claim 6, comprising drilling through the material at least partially covering the opening of the hole to form an unthreaded extension of the hole, the unthreaded extension having a diameter corresponding to a minor diameter of the existing threads formed in the hole.

8. The method of claim 1, wherein the hole is a blind hole.

9. The method of claim 1, wherein adding material to the region of the part includes using welding to add material to the region of the part.

10. A method of repairing a casting, the method comprising:
    receiving the casting, the casting including a defect in a face around an opening of a hole with existing threads formed in the hole;
    installing a tap inside the hole, the tap threadably engaged with the existing threads formed in the hole;
    after installing the tap inside the hole, adding material to the casting to at least partially cover the defect in the face and at least partially cover a periphery of the opening of the hole with the existing threads; and
    after adding the material to the casting, using the tap to form new threads in the material added to the casting, the new threads being continuous with the existing threads formed in the hole.

11. The method of claim 10, wherein:
    the tap is disposed entirely inside the hole when the tap is installed inside the hole;
    the tap has a leading end; and
    the leading end of the tap is facing the opening of the hole when the tap is installed inside the hole.

12. The method of claim 11, wherein forming the new threads in the material comprises:
    engaging a tool with the tap; and
    using the tool to rotate the tap and cause the tap to be driven out of the opening of the hole while forming the new threads in the material added to the casting.

13. The method of claim 12, comprising, before using the tap to form new threads in the material added to the casting, drilling through the material added to the casting to form an unthreaded extension of the hole, the unthreaded extension having a diameter corresponding to a minor diameter of the existing threads formed in the hole.

14. The method of claim 12, wherein the hole is a blind hole.

15. The method of claim 10, wherein adding material to the casting includes using welding to add material to the casting.

16. The method of claim 10, wherein the defect includes a depression in the face around the opening of the hole.

* * * * *